(12) United States Patent
Rhoten et al.

(10) Patent No.: US 7,484,106 B2
(45) Date of Patent: Jan. 27, 2009

(54) PRE-LOGIN DATA ACCESS

(75) Inventors: Matthew Paul Rhoten, Seattle, WA (US); Suresh Velagapudi, Woodinville, WA (US); Ravipal Soin, Bellevue, WA (US); Sterling Reasor, Bellevue, WA (US); John Stephens, Sammamish, WA (US); William Mak, Seattle, WA (US); Jerry R. Hughson, Jr., Bothell, WA (US); Krishna Kotipalli, Issaquah, WA (US); Piero Sierra, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 760 days.

(21) Appl. No.: 10/692,014

(22) Filed: Oct. 24, 2003

(65) Prior Publication Data

US 2005/0091673 A1 Apr. 28, 2005

(51) Int. Cl.
*H04L 9/32* (2006.01)
*G06F 7/04* (2006.01)
*G06F 12/00* (2006.01)

(52) U.S. Cl. .......................... 713/193; 726/16; 726/17; 726/18; 726/19; 726/27; 726/28; 726/29; 726/30; 726/2; 726/3; 713/182; 713/189

(58) Field of Classification Search .................. 713/193
See application file for complete search history.

(56) References Cited

U.S. PATENT DOCUMENTS 6,052,785 A 4/2000 Lin et al.
6,088,799 A 7/2000 Morgan et al.
6,185,685 B1 2/2001 Morgan et al.
6,697,840 B1 * 2/2004 Godefroid et al. ........... 709/205
2001/0001876 A1 5/2001 Morgan et al.

FOREIGN PATENT DOCUMENTS

JP 410340146 A * 12/1998
WO WO-00/73916 A1 12/2000

OTHER PUBLICATIONS

Jin Jang et al., "Client-Server Computing in Mobile Environments", ACM Computing Surveys, vol. 31, No. 2, pp. 117-157, Jun. 1999.
Anthony Joseph et al., "Rover: A Toolkit for Mobile Information Access", ACM, pp. 156-171, 1995.
Christine M. Kincaid et al., "Electronics Calendars in the Office: An Assessment of User Needs and Current Technology", ACM Transactions on Office Information Systems, vol. 3, No. 1, pp. 89-102, Jan. 1985.
Naftaly H. Minsky et al., "Ensuring Integrity by Adding Obligations to Privileges", pp. 92-102, IEEE 1985.

* cited by examiner

*Primary Examiner*—Longbit Chai
(74) *Attorney, Agent, or Firm*—Birch, Stewart, Kolasch & Birch, LLP

(57) ABSTRACT

A system and process for interacting with a system in an insecure state is described. Before logging into a secure state of a computer system, a user is able to access limited information including calendar information regarding meetings for that day and the like. In some aspects of the invention, a user may interact with a displayed note pad for receiving handwritten or typed notes. Aspects of the described system and method permit a user to quickly review or interact with a computer prior to logging into a secured state of the computer system.

17 Claims, 11 Drawing Sheets

PRE-LOGIN DATA ACCESS

BACKGROUND OF THE INVENTION

1. Field of the Invention

Aspects of the present invention relate to information access. More specifically, aspects of the present invention relate to displaying selected information prior to secure logon to a computer system or any data source.

2. Description of Related Art

Portable computer continue to alter people's use of information. Prior to the portable computer, people would jot down meetings in a paper calendar. Now, people rely on a calendaring program to alert them to their next meeting. One downside to storing a person's calendar in a portable computer is the delay in booting up the machine. In some situations, one would have to wait a few minutes before a system would permit access to the calendaring program. In some operating systems, this delay is compounded by the need to log into a secured system to access the meeting information. Thus, users commonly would keep detailed calendars in their computers and print out a copy of the day's schedule to be taken with the computer for quick access to meeting information.

Personal data assistants (PDAs), in contrast, provide quick access to calendars and other information. The quick access to information is also a detriment of PDAs in that a user is left with no secure way of authenticating himself to the PDA. Because of the less secure nature of PDAs, users are reluctant to keep sensitive or personal documents on PDAs but instead keep them on the portable computers. Further, the meeting information is only as relevant as last synchronized with the user's primary machine. Thus, computer users show up to meetings with both a portable computer and a FDA.

FIGS. 3, 4, and 5 illustrate these issues. FIG. 3 shows a system of the typical PDA. Here, an insecure data storage 301 stores and sends information to applications 302-304. A user is reluctant to store anything that is sensitive or personal (for instance, company confidential documents or credit card numbers).

FIG. 4 shows a conventional, secure login system. It includes an insure area 401 (pre-login), a secure area 402, with divider 403. Here, a user (after pressing the control, alternate, and delete keys simultaneously) is provided with a username and password query window. Other techniques are known for secure logins. After authenticating the person to the system, the system crosses divider 403 into the secure area 402. While in the secure area, the user may access applications 406-408. Notably, none of applications 406-408 is available on the insecure side 401 of divider 403. The only access to applications 406-408 is by logging into the system.

FIG. 5 shows a conventional computer process for accessing calendar or other information. A system may be in a variety of different power off modes. First, the system may be completely shut down. Starting up can take from 15 seconds to 3 minutes to boot up. In other situations, the system may be in a standby state. Stand by states are becoming increasingly popular among users who hop between meetings as completely powering off then booting a cold machine involves significant time (a few minutes on average). A standby state stores system information in memory, thereby only taking a few seconds to resume from standby.

Referring to FIG. 5, a system 501 is in a powered off state (standby, for example). A user presses a power button. The system starts up at time 502. At 503, a user is presented with the opportunity to login. No other option is available for the user. Next, the user activates a security sequence to force the system to provide a secure login window. Other techniques are known in the art. The system next provides (in less than a second) a login window 505. The user starts entering his password at time 506 (taking about 10 to 20 seconds to do so). Next, the user is logged in and starts to access information relating to his next meeting at time 507 (which can take 10 to 30 seconds). There are three effective states for this example: user not logged in 508, username and password being entered 509, and user logged in 510.

Some computer systems (for example, late model HP/Compaq computers) permit a display of next meeting information based on a cold boot (not from standby). This approach appears only as a BIOS operation, not once the operating system has been loaded. However, as more people use a standby state of a computer, this approach will not provide quick access to next meeting information.

BRIEF SUMMARY

Aspects of the present invention address one or more of the issues mentioned above, thereby providing quicker access to information. Various aspects of the present invention include providing non-sensitive information to a user including meeting and/or calendar information. In other aspects, a user may be provided with a writing surface on which to jot or type notes. In yet further aspects, a user may be provided with a variety of applications prior to login.

These and other aspects are addressed in relation to the Figures and related description.

BRIEF DESCRIPTION OF THE DRAWINGS

The present invention is illustrated by way of example and not limited in the accompanying figures in which like reference numerals indicate similar elements and in which.

DETAILED DESCRIPTION OF THE DRAWINGS

Figure 1:
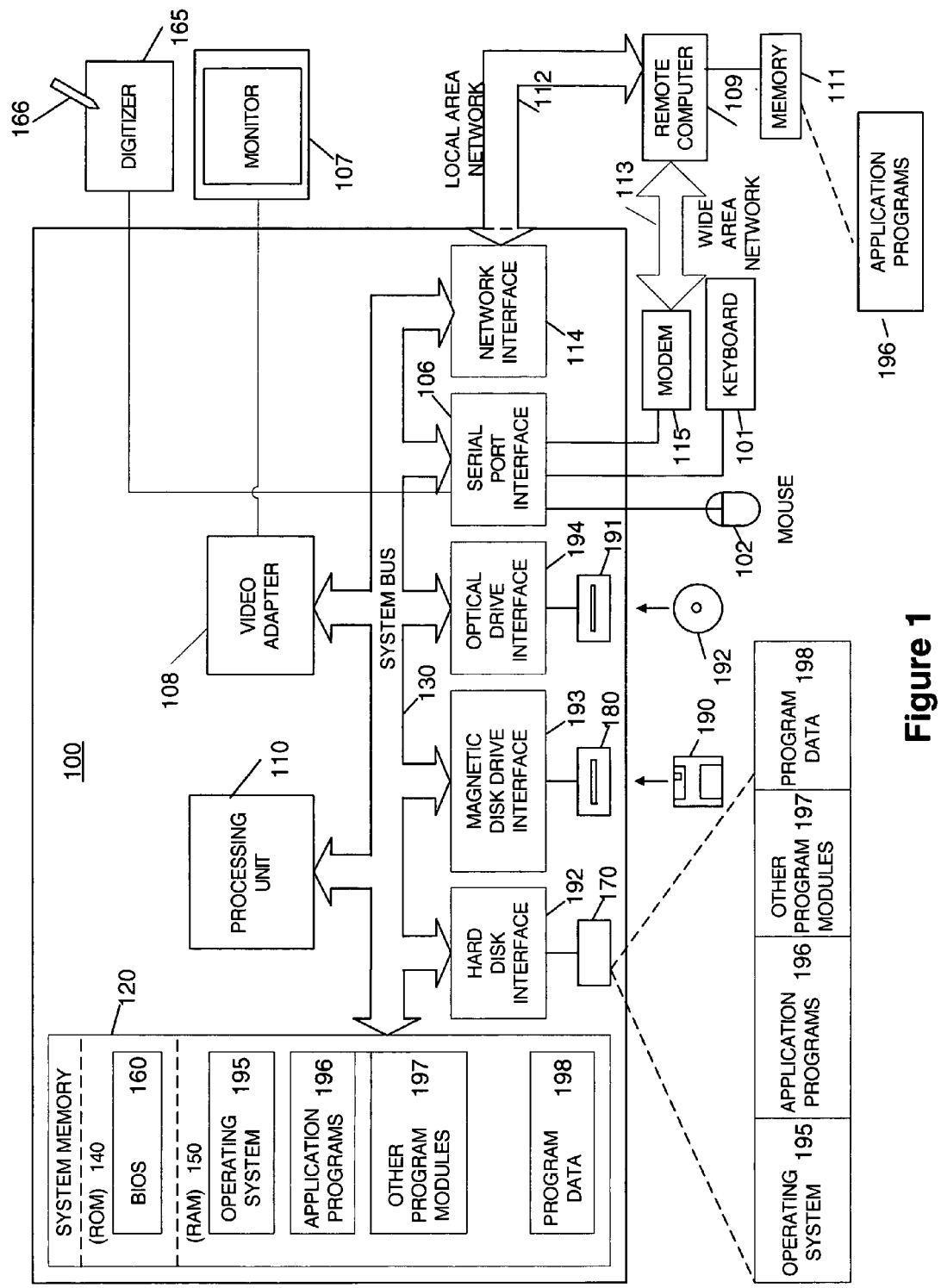
FIG. 1 shows a general-purpose computer supporting one or more aspects of the present invention.

Aspects of the present invention relate to a system and method of accessing non-sensitive information prior to logging into the system. In some aspects, the user may be allowed to create or record information for later retrieval. The ability to create or record information may in the form of handwritten or spoken notes. Handwritten notes may take the form of electronic ink. Aspects of the present invention allow applications to render data not deemed to be a security risk at the logon UI without the user providing credentials. This type of quick access to low-risk data actually preserves security as it prevents someone from watching a user enter his or her password just to jot down a phone number. Here, a secure state of the system is maintained despite the ability to receive information from an untrusted source. For instance, the system may obtain information from a client's calendar, sanitize the data and put it in a safe storage for a logon process to read.

This document is divided into sections to assist the reader. These sections include: characteristics of ink; terms; general-purpose computing environment; pre-login access to information; and illustrative displays.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence of strokes, where each stroke is comprised of a sequence of points. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink), among other information.

Terms

Ink—A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. The strokes may be combined into an ink object.

Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

General-Purpose Computing Environment

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. Further, the system may include wired and/or wireless capabilities. For example, network interface 114 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
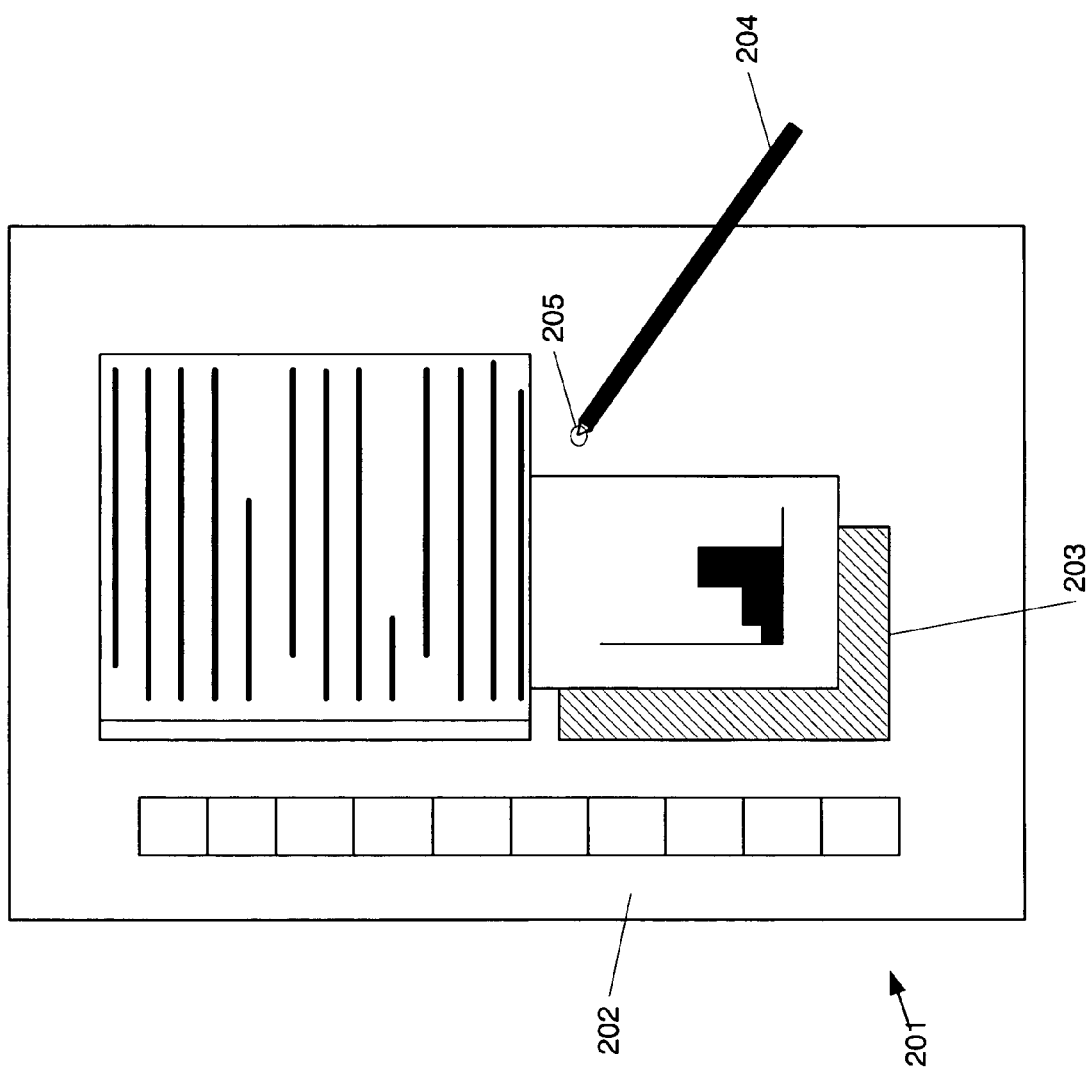
FIG. 2 shows a display for a stylus-based input system according to aspects of the present invention.
Figure 3:
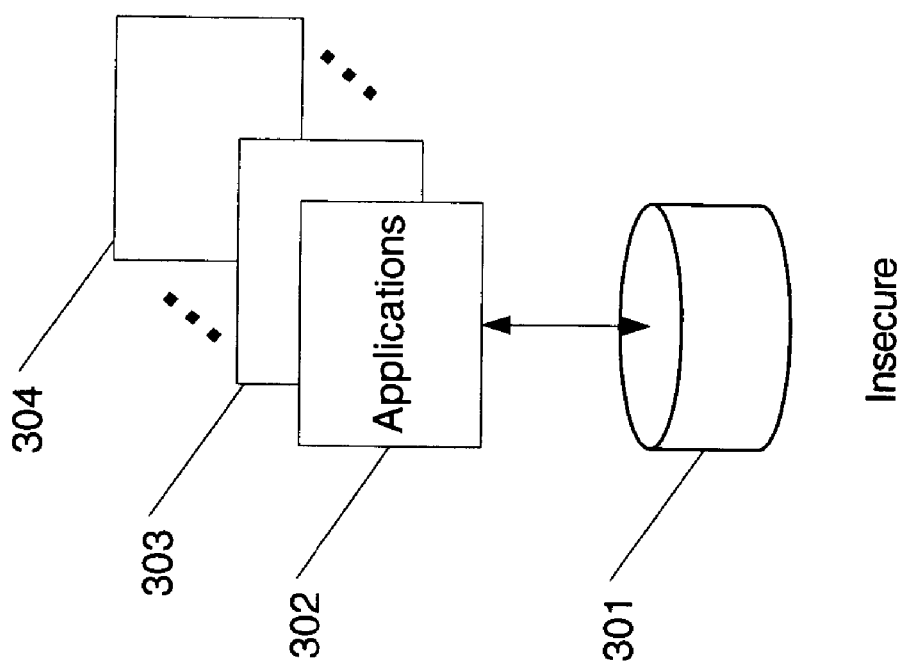
FIG. 3 shows a conventional insecure system accessing information.
Figure 4:
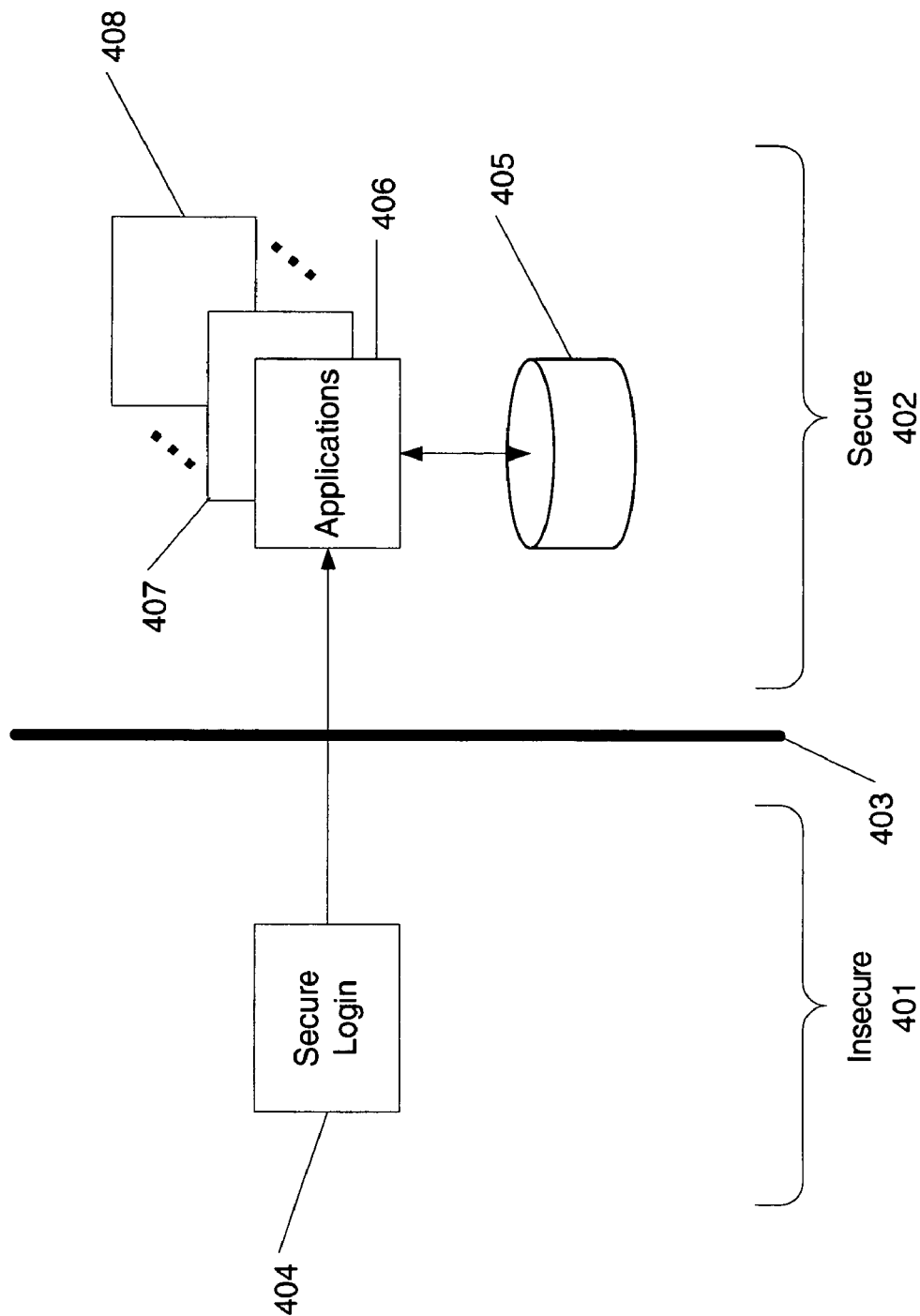
FIG. 4 shows a conventional secure system accessing information.
Figure 5:
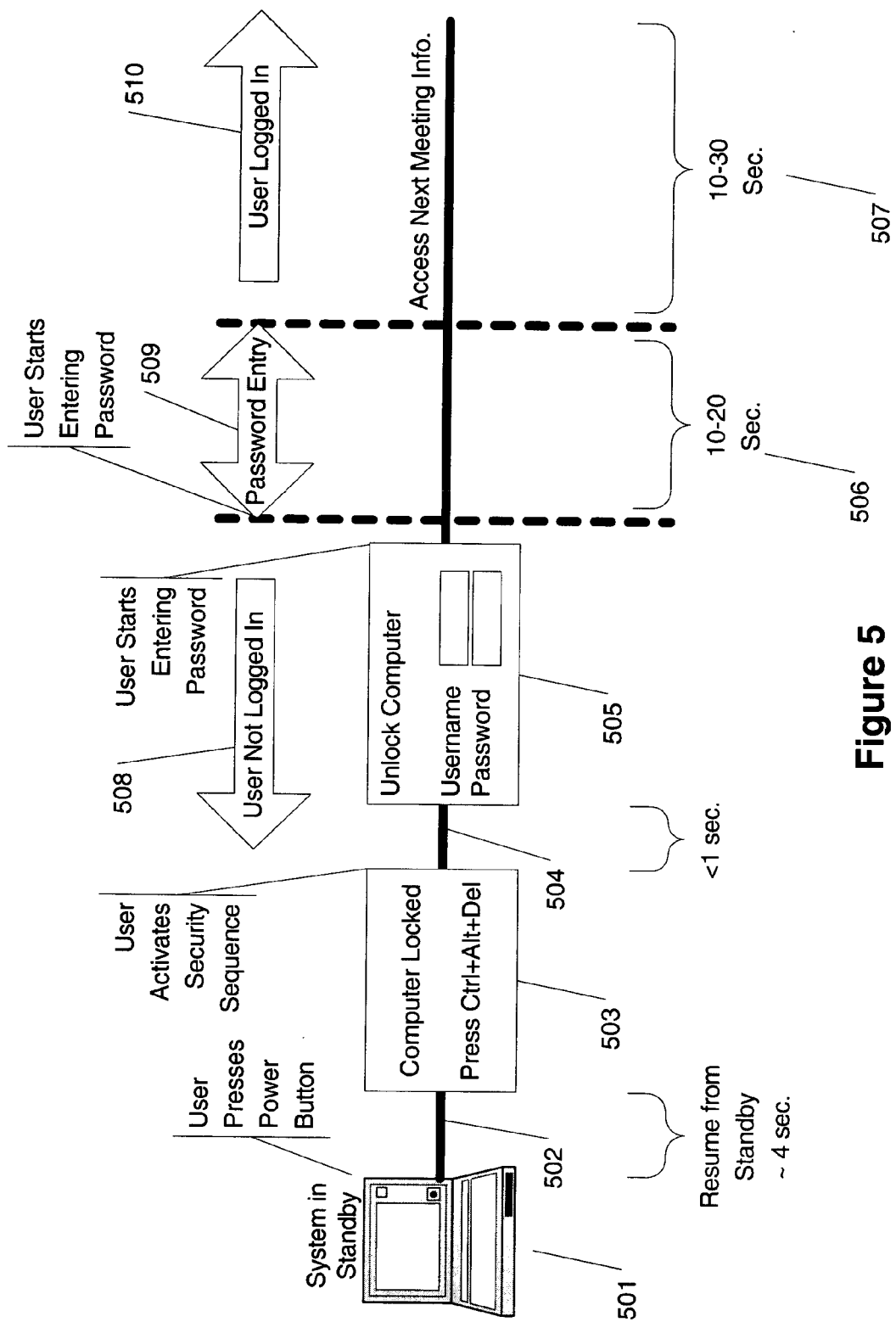
FIG. 5 shows a conventional process for logging into a secured system.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Pre-Login Access to Information

Aspects of the present invention permit a user to access limited information or interact with a computer without having to first login. For instance, a user may access the current day's meeting schedule or be provided with a notepad for taking notes without needing to securely authenticate himself to the system. Also, the next day or even week may be provided to a user.

Figure 6:
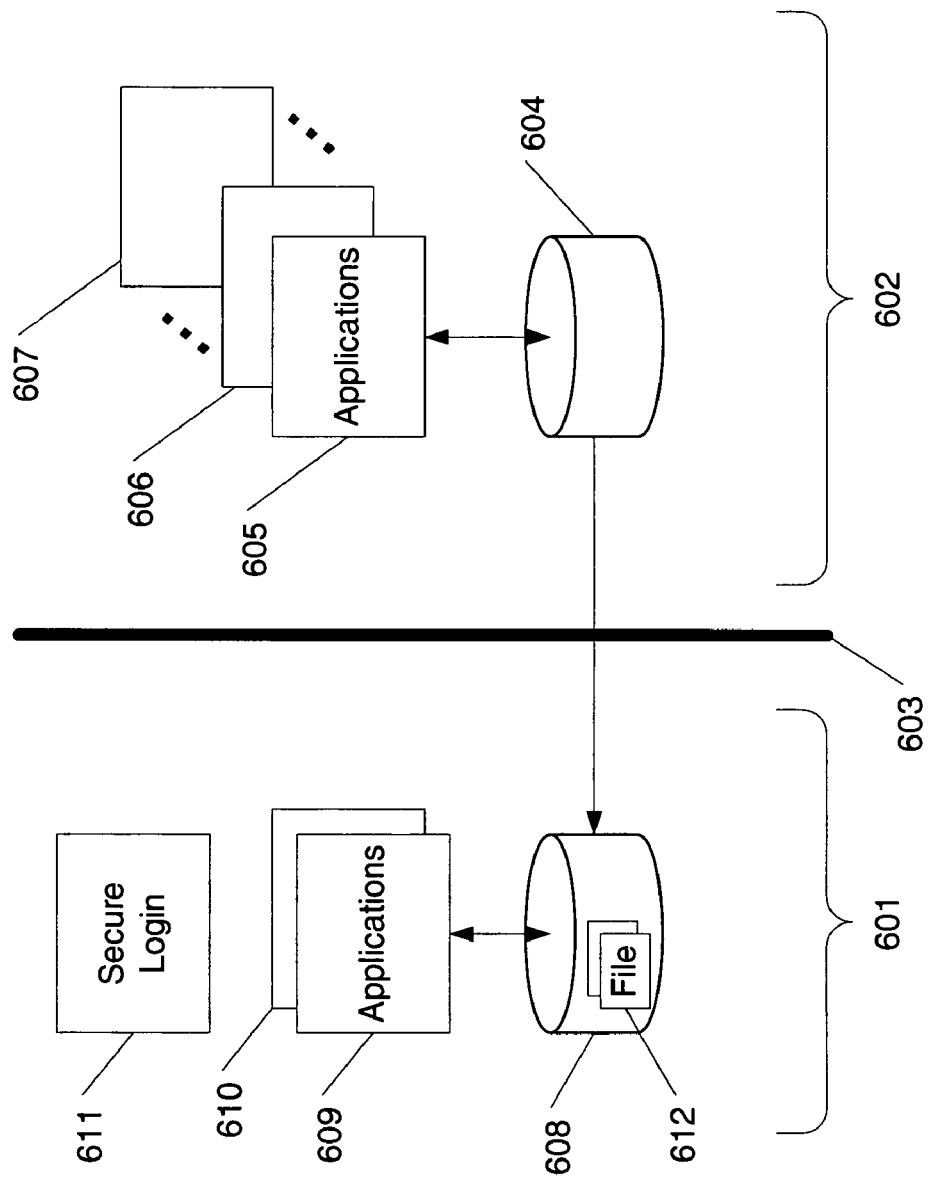
FIG. 6 shows a system for allowing limited access to information before a secure login in accordance with aspects of the present invention.

FIG. 6 shows an illustrative example of the system. An insecure state is shown as state 601 and secure state is shown as 602. The separation 603 is a successful authentication of the user. Once logged in, a user may access data storage 604 using applications 605-607. Separate data storage 608 may also be accessed while in the insecure state 601. Separate data storage 608 may be a physically separate storage from storage 604. Alternatively, data storage 608 may be a predefined area of storage 604 of which applications 609-610 may access. To maintain the secure state 602, applications 609-610 may not access any other data storage than that of data storage 608. Further, storage 608 may be a temporal storage in 604 which encompasses only the current day. Storage 608 may also be a flash card or other type of removable media. Applications 609-610 may be applications and/or controls that provide the information to the user.

Data storage 608 may be synchronized with information from data storage 604. The synchronization may occur at various events or time periods including but not limited to the following:

At login/logoff;

After an elapsed period of time (for instance, 10 minutes, 1 hour, once per day, etc.);

After a predetermined idle time (for instance, 10 minutes, 1 hour, and the like);

Upon request by an application or upon notification by an application that its information has been updated (a calendaring program indicating that a new meeting has been added);

When a computer's network status changes (for instance, when the computer attaches to a new network and/or when resources become available that were previously not available; and, On a user event (user requesting synchronization).

Further, synchronization may not be used. For instance, applications 605-607 may write data directly to the data storage 608 (for instance a WinFS calendar or contact store). Applications 609-610 may then read information from data storage 608. Accordingly, synchronization may or may not be used depending on desires of a developer.

The data storage 608 may take the form of a data file. The data file may contain calendar and other information in a readily accessible format. For instance, information may be stored in XML format or another mark up language format. Further, the information may be stored in other formats as well including a word processor format, a graphics format, or in ASCII.

To be able to receive information into data storage 608, one may push information from data storage 604 through applications 605-607. The information may be handled by one or more of the following techniques to push the information:

MAPI

Exchange Server Objects (XSO)

CDO

IMAP/iCAL

WebDAV

POP

Meeting Maker (by Meeting Maker, Inc. of Waltham, Mass. 02452);

Netscape® of the Netscape Corporation; and

A Lotus Notes® specific operation.

The system may examine the calendar and obtain items (in the example of a calendaring system) for various intervals. The intervals may include:

One week from the present day; and

A specified date range (here, one may only grab meetings forward of the present date and time. Alternatively, one may also want to obtain past meetings to account for different time zones).

In some situations, it may be beneficial to examine recurring meeting information. This information may then be pushed to the data storage 608.

Next, a data file or files 612 may be constructed to provide easy access for the applications 609-610. For instance, a calendar or meeting file may have one or more of the following: a start and stop time, subject, location, organizer, and the like. Other attendees may or may not be listed. In some situations, a user may not have any security concerns regarding the listing of attendees. In other situations, the list of others at a meeting may be sensitive or personal. Other types of information may include the current sync time and other application-specific information relevant to applications 609-610.

To maintain security, the system may permit only selective applications to access the data file or files 612 in the data storage 608. For instance, the file 612 may have associated with it an access control list (ACL). Here, each application may have its own security identification. One may then use a security ID (SID) to interface with access control entities (ACEs) to permit the applications access to the file in data storage 608. A file's ACL may include, for example, an application's SID that permits reading and writing and a special SID (named SYSTEM) that permits reading only. The special SID may or may not be used. This ACL, among others, provides that only the actual application will write to file 612, preventing malicious attackers from writing to the file and having their code executed and putting bogus data on the login screen. Other variations are possible. The file 612 in storage 608 may be unencrypted or encrypted. Further, the file 612 may be signed or unsigned. The file 612 may be read by a logon script. For example, the logon script may be Winlogon as used in some Windows®-based operating systems. In short, a file has an ACL, the ACL includes ACEs; each ACE lists an ID and some privileges for that ID. A sample ACL is provided below:

ACE #1: Sync application SID->read/write

ACE #2: Special system SID->read

Figure 8:
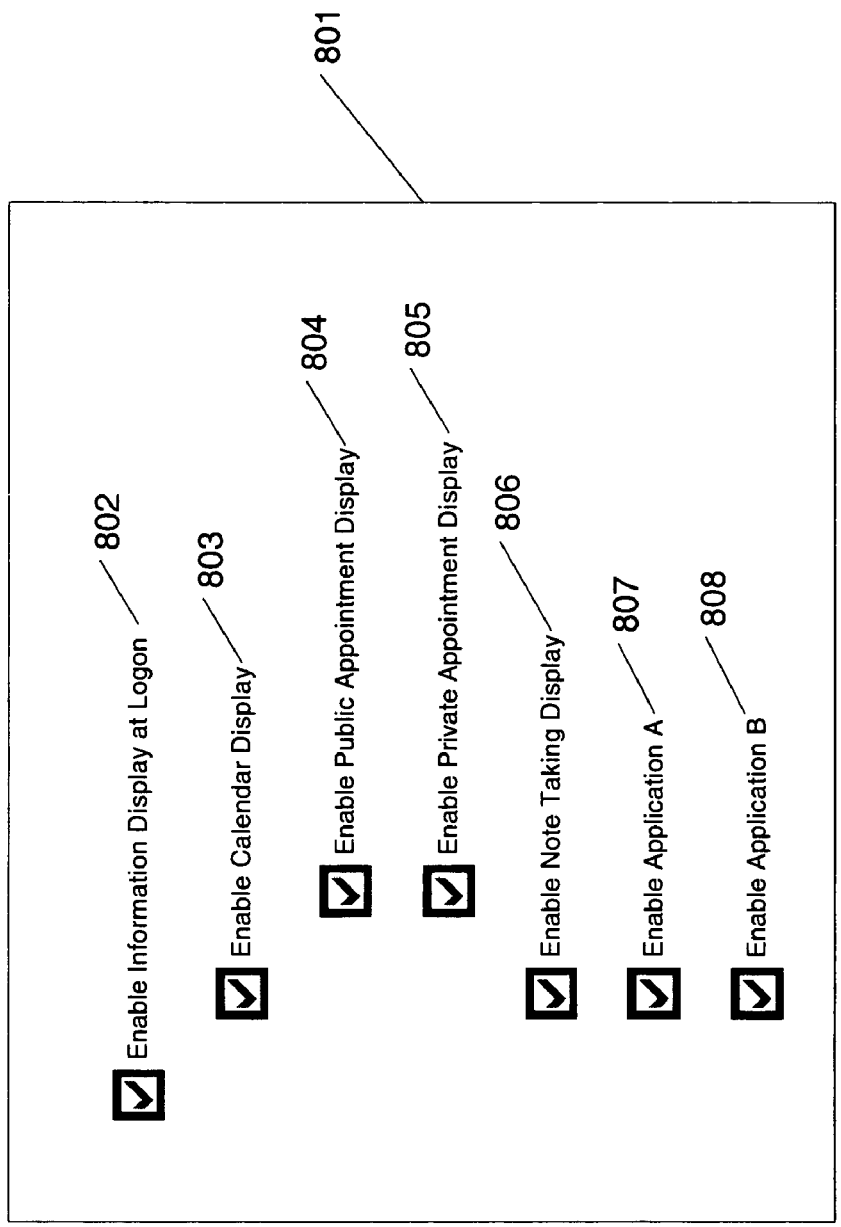
FIG. 8 shows an illustrative display of options available for a user in accordance with aspects of the present invention.

When a system is turned on, the system may attempt to provide applications 609-610 to a user. Alternatively, the system may wait until one, some, or all of the following has occurred:

File 612 exists and contains information for one or more of applications 609-610;

The user has turned on the ability to access information prior to login (see FIG. 8);

A system administrator has turned on (or not turned off) the ability to access information prior to login; and The file 612 has been checked.

Checking file 612 may include one or more analyses. First, the size of the file 612 may be examined to ensure that it is not larger or smaller than expected or permitted. Second, the ACL may be examined (or other access controlling system). Third, the application or applications' SID may be examined to ensure that the application which wrote the data was the authorized application. This step is checking the SID, finding the application it is for, and then validating that application. Because it is not trustworthy data, one need in the storage format of file 612 is that it be easily validated at read time.

If the system verifies that the file 612 may be accessed before login, then the system reads the file and displays its data to a user.

The system may lock a user from modifying the displayed information. This is to ensure that only an authenticated user may update this information. Alternatively, the user may be permitted to modify this information in the insecure state then allow the system to update the information in data storage 604 for new, deleted, or changed information. This may be done automatically, or a user may be queried for the modifications (to ensure that an authenticated user actually permits the modifications).

The information provided to a user may include calendar information. Alternatively or additionally, the information may include a set a reminders.

Figure 7:
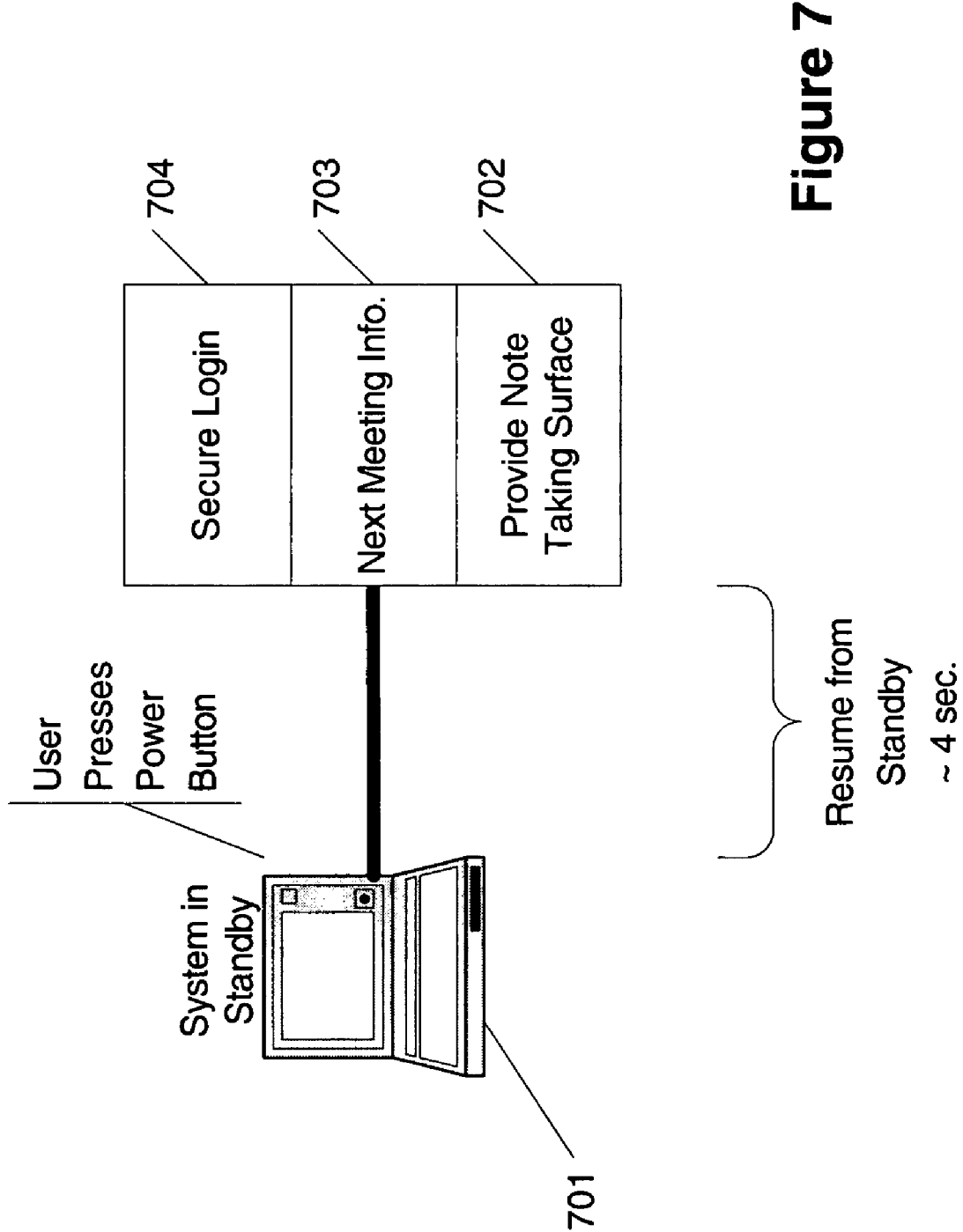
FIG. 7 shows an illustrative system for accessing information or system processes prior to performing a secure login in accordance with aspects of the present invention.

FIG. 7 shows an example of a process for what may be provided to a user prior to login. A user starts a system at 701. Here, the system may be in a stand-by state. This resumption from standby may occur when a user presses a power button. The resumption may take a few seconds. A user then may be provided a secure login screen 704, next meeting information 703 and, possibly, access to other applications. Other applications may include games, a calendar, and (as shown as option 702) a note taking surface. The note taking surface may receive textual notes (typed in from a keyboard) or handwritten notes (electronic ink created with a stylus) or both.

FIG. 8 shows a dialog box 801 that permits a user to configure how information is to be displayed before login. A user may enable information to be displayed at login 802. The user may specify which applications are to be accessed and configuring what type of information may be accessed. For instance, a user may enable a calendar display 803 including the display of public appointments 804, the display of private appointments 805 and the like. Another application that may be enabled is a note taking application 806. The note taking application may be useful for users who want to jot down a quick note without having to pull out a piece of paper or want to keep it in a location that is readily accessible. Finally, other applications 807 and 808 may be enabled to be displayed as well.

Illustrative Displays

Figure 9:
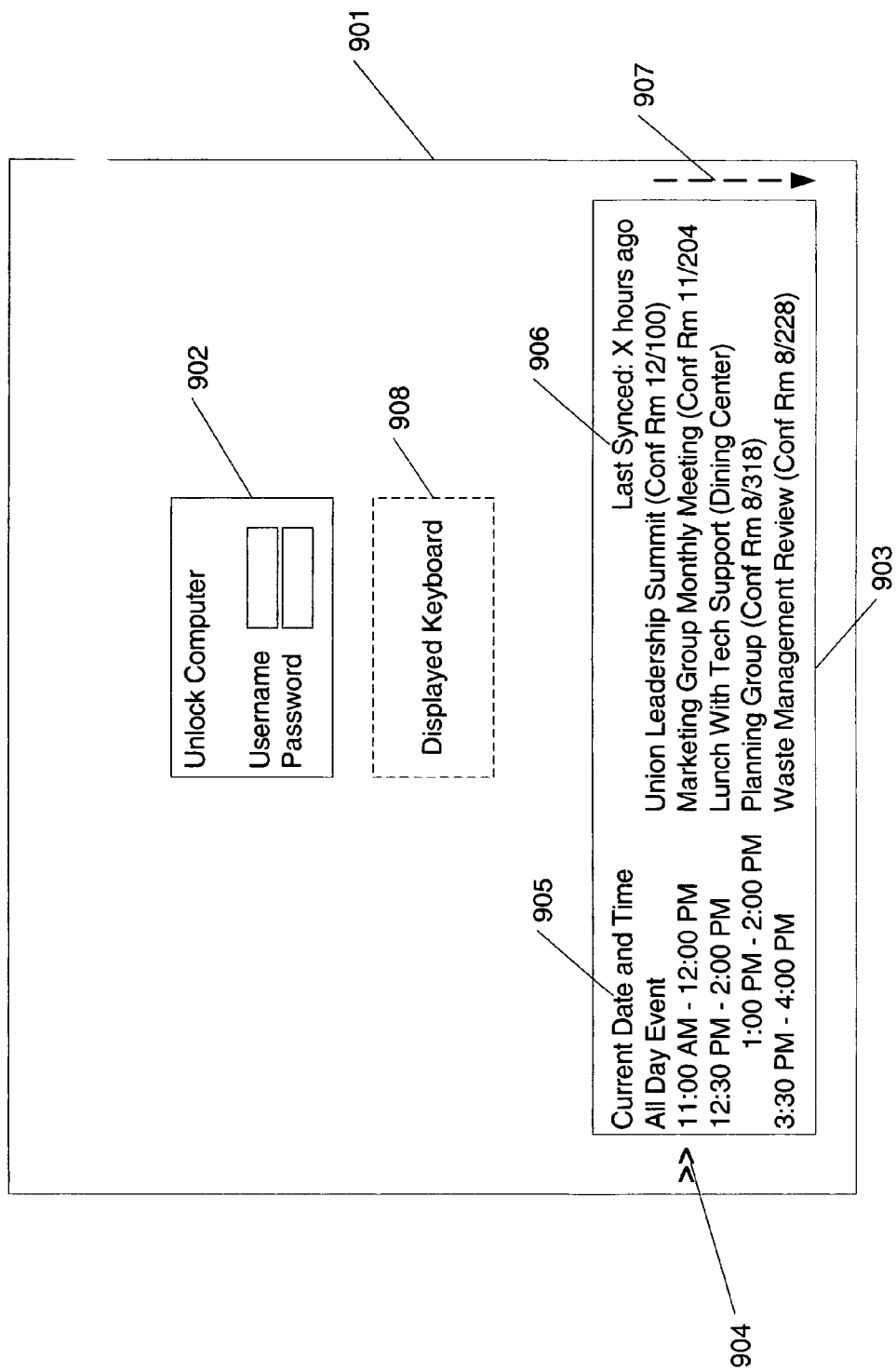
FIG. 9 shows an illustrative display of a calendar in accordance with aspects of the present invention.

FIG. 9 shows an example of a display 901 in accordance with aspects of the present invention. Display 901 includes a logon interface 902. A virtual keyboard may or may not be provided 908. Region 903 may display a calendar relevant to the current day and time. The current meeting may be displayed with an indicator 904. The current day and time may be displayed as well 905. The last sync operation may be displayed in terms of time elapsed since sync or time and day of the last sync 906. If additional items need to be shown, the calendar may scroll as shown by arrow 907. The system may adjust the interface to eliminate the display of overlapping meetings as generally happens on a time-based grid view.

Figure 10:
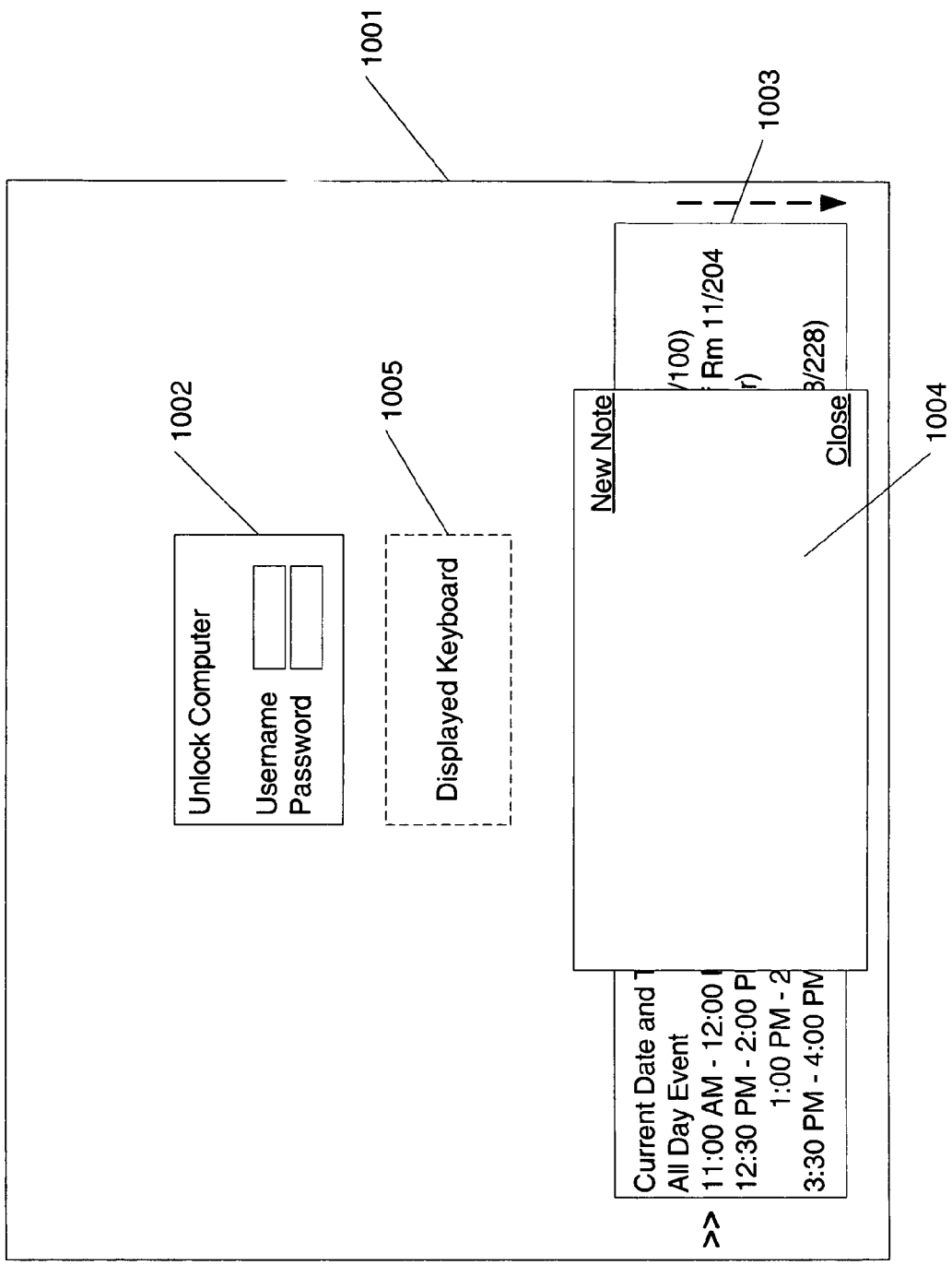
FIG. 10 shows an illustrative display of a notepad in accordance with aspects of the present invention.

FIG. 10 shows an example of a note taking region in accordance with aspects of the present invention. Display 1001 may include a secure login 1002 with an optional keyboard 1005 and a calendar display 1003. Here, a note taking region 1004 may be also provided to a user. The regions 1003 and 1004 may or may not overlap, based on consideration of the size of display 1001 and the relative sizes of the regions 1003 and 1004. The region 1004 may include some functionality including creating a new note (shown by the new note clickable region) and closing the region (shown by the close clickable region). The notes created in region 1004 may be stored in file 612 in storage 608 or may be stored in a new file in storage 608. Further, the notes may not be stored but kept in memory (to prevent any insecure data from being written while the system is in an insecure state). Upon login, any notes to be stored may be then stored in accordance with other note taking applications (for instance storing the information in storage 604). This may entail that few or no higher order features are available to the notes. For instance, no saving, copying, pasting, or duplicating of notes may be possible. Moving notes into storage may or may not include performing similar file checks to ensure no malicious code or data is being pushed into the secure state of the system 602.

Figure 11:
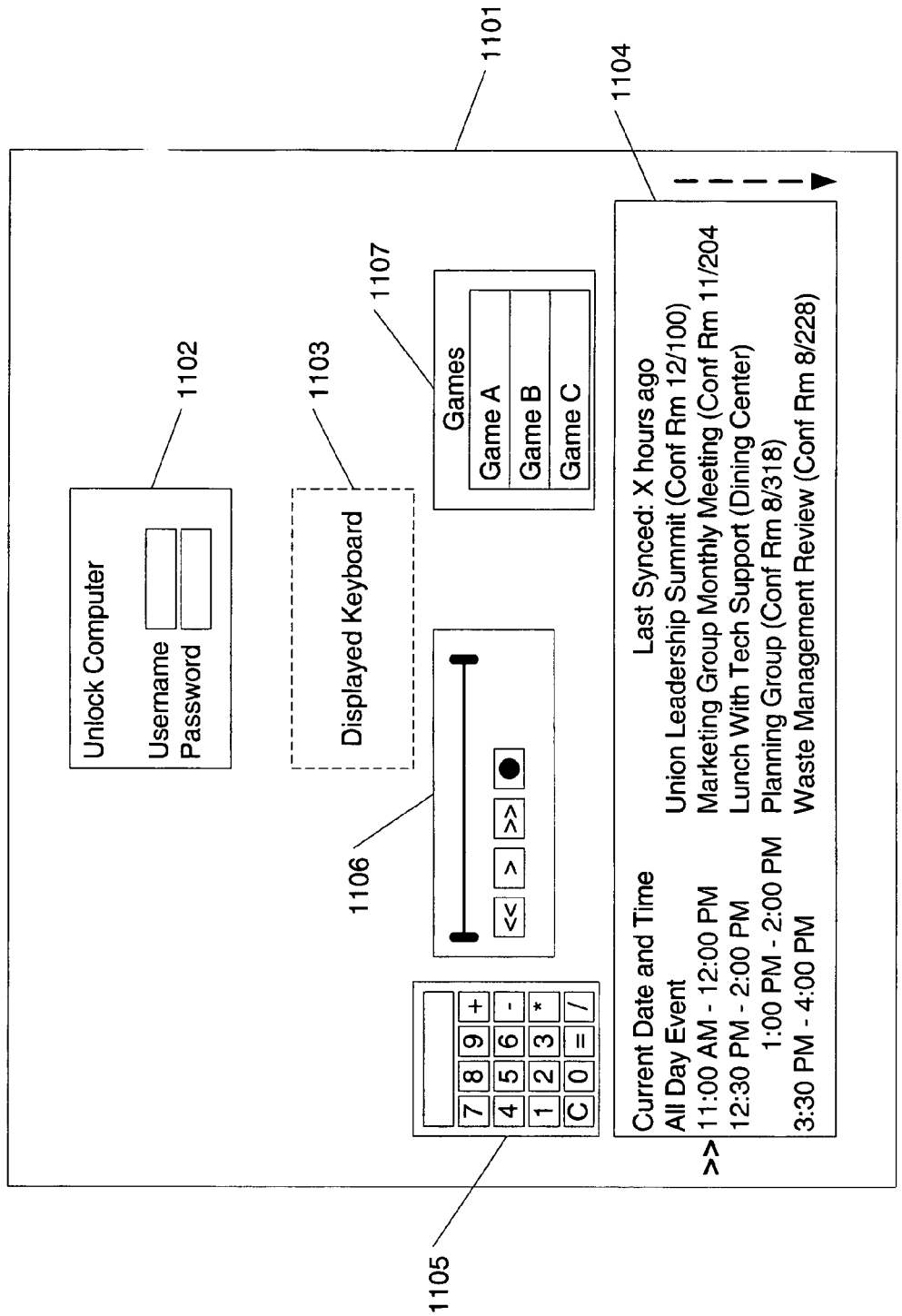
FIG. 11 shows an illustrative display of a variety of applications in accordance with aspects of the present invention.

FIG. 11 shows a display in accordance with other aspects of the present invention. FIG. 11 includes a display 1101 with a secure login region 1102 and an optionally displayed keyboard 1103. The system providing the display 1101 shows a calendar 1104 and other applications. The other applications that may be displayed may have minimum security risks when used outside of the secure login state 602. Here, calculator 1105, voice recorder 1106, and games 1107 (having games A, B, and C) may be provided to a user.

In yet another aspect of the present invention, information may be pushed to a user before a user has logged into a secure system, resource, or application. For instance, one may be presented with local information of relevance prior to actually logging in. This information may include movie times, local weather, current forecast, sports information, and the like. This information may be retrieved from information previously obtained and stored in storage 608. Alternatively, the information may be accessed from a remote data source (for example, pulling the information from a remote system that obtains the information from over the internet). This may include a remote server or a local server that obtains the information and serves it locally to the system.

In another aspect of the present invention, the information may be provided to a user through other pathways. For instance, the information may be provided to a user through a screen saver. The screen saver may or may not require a secure log in to remove. Further, the information may be rendered as a background image behind other information to provide the user with the information.

Aspects of the present invention have been described in terms of illustrative embodiments thereof. Numerous other embodiments, modifications and variations within the scope and spirit of the appended claims will occur to persons of ordinary skill in the art from a review of this disclosure.

We claim:

1. A computer device, the computer device being a tablet PC or handheld computer, the computer device comprising:
   a display;
   a memory;
   a first storage having at least one file containing sensitive information;
   a second storage having at least one file containing non-sensitive information;
   and
   a processor controlling a secure state and an insecure state of said computer device, said processor having applications that have access to said at least one file in the second storage while said computer device is in said insecure state, the processor denying the applications access to the information in the first storage while said computer device is in said insecure state,
   wherein the computer device transitions from a standby state directly to the insecure state to present a user an opportunity to login, the standby state being a powered off state of the computer device which is different than a complete shut down of the computer device;
   wherein the computer device transitions from the insecure state to the secure state based on the user login which is independent of said applications;
   wherein during the insecure state upon resumption from said standby state the computer device is enabled to execute one of the applications to input audio or textual application information to be kept in the second storage and to be transferred to the first storage only when the user login is authenticated.

2. The computer device according to claim 1, said processor further having a calculator program, a calendaring program or a note taking application available to the user during the insecure state.

3. The computer device according to claim 1, wherein the first and second storages are physically separate storage devices.

4. The computer device according to claim 1, wherein the first and separate storages are predetermined areas of storage on the same physical device.

5. The computer device comprising:
   a display;
   first and second storages, wherein the first storage having at least one file containing sensitive information, and the second storage having at least one file containing non-sensitive information; and
   a processor controlling a secure state and an insecure state of said computer device, said processor having at least one application that is executed while said computer device is in said insecure state, the processor denying the at least one application access to the information in the first storage while the computer device is in the insecure state, wherein the processor is configured to:

cause the computer device to transition from a standby state directly to the insecure state to present a user an opportunity to login, wherein the standby state is a powered off state of the computer device which is different than a complete shut down of the computer device; and control transitions from the insecure state to the secure state based on the user login which is independent of said at least one application;

wherein during the insecure state upon resumption from said standby state the computer device is enabled to execute the at least one application to receive input information from the user to be kept in the second storage and to be transferred to the first storage only when the user login is authenticated.

6. The computer device according to claim 5, said application is a note taking application for receiving textual notes.

7. The computer device according to claim 5, said application is a note taking application for receiving handwritten notes in electronic ink.

8. The computer device according to claim 5, said application is a voice recording application.

9. The computer device according to claim 5, said application is a calculator application.

10. The computer device according to claim 5, said application is a game.

11. The computer device according to claim 5, further comprising:

a storage for storing information when said system is in said secure state, said information originating from said application interacted with while said system was in said insecure state.

12. The computer device according to claim 5, said application is a calendaring application and said system further comprising:

a storage for storing calendar information, said information being accessed by said calendaring application.

13. The computer device according to claim 5, the computer device being a tablet PC or a personal digital assistant.

14. The computer device of claim 4, wherein:

the second storage has a first file containing non-sensitive information, the first file being accessed by the at least one application while the computer device is in the insecure state;

the second storage is synchronized with information in the first storage during a predetermined time period or event, said first storage has a second file accessed by the at least one application, or by another application executed by the processor, while the computer device is in the secure state, and at least part of the non-sensitive information in the first file is transferred to the second file during the synchronization.

15. The computer device according to claim 14, wherein the procesor prevents the at least one application from accessing the first storage while the computer device is in the insecure state.

16. The computer device according to claim 5, the computer device being a personal digital assistant.

17. The computer device according to claim 5, further comprising a storage having sensitive and non-sensitive information, wherein the processor prevents the at least one application from accessing the sensitive information while the computer device is in the insecure state.

* * * * *